United States Patent [19]
Lee et al.

[11] Patent Number: 5,592,319
[45] Date of Patent: Jan. 7, 1997

[54] ALL-OPTICAL SIGNAL PROCESSING APPARATUS OF NON-LINEAR FIBER LOOP MIRROR TYPE

[75] Inventors: Hak-Kyu Lee; Kyong-Hon Kim; Seo-Yeon Park; El-Hang Lee, all of Daejeon, Rep. of Korea

[73] Assignee: Electronics and Telecommunications Research Institute, Daejeon-Shi, Rep. of Korea

[21] Appl. No.: 360,140

[22] Filed: Dec. 20, 1994

[30] Foreign Application Priority Data

Apr. 13, 1994 [KR] Rep. of Korea .................. 94-7777

[51] Int. Cl.$^6$ ..................................... H04J 14/02
[52] U.S. Cl. ..................... 359/127; 359/128; 385/32; 356/345
[58] Field of Search ....................... 359/127, 128, 359/133, 139, 140, 168–170; 385/18, 32; 356/345; 250/227.12

[56] References Cited

U.S. PATENT DOCUMENTS 5,402,231  3/1995  Udd ........................... 356/345

*Primary Examiner*—Wellington Chin
*Assistant Examiner*—Kinfe-Michael Negash
*Attorney, Agent, or Firm*—Larson and Taylor

[57] ABSTRACT

An all-optical signal processing apparatus of a non-linear fiber loop mirror type comprises a very high-speed all-optical switch that can be used as a reverse multiplexed switch in a high-speed time division optical communication. The apparatus includes a non-linear loop mirror for switching signal light by adjusting light using the non-linear effect of an optical fiber and the characteristics of a sagnac interferometer as the fundamental configuration. The all-optical switch is constructed so that another adjustment light having an appropriate time delay with respect to an existing adjusting light is additionally introduced in order to compensate for the limitation on the switching bandwidth imposed by the walk-off between adjusting and signal lights in a conventional non-linear optical fiber loop mirror. This compensates for the cross-talk of the noise signals due to DC components generated in the conventional apparatus. A switching window of a desirable size is obtained by properly adjusting the time delay between two adjusting lights and resolving the bandwidth limitation of the switch due to the walk-off of the adjusting and signal lights according to the timing jitter of signal light.

1 Claim, 4 Drawing Sheets

ALL-OPTICAL SIGNAL PROCESSING APPARATUS OF NON-LINEAR FIBER LOOP MIRROR TYPE

BACKGROUND OF INVENTION

The invention is related to providing an all-optical signal processing apparatus which is one of the important elements used in the field of a very high-speed optical communication and in optical signal processing, and in particular, to providing an all-optical signal processing apparatus of a non-linear fiber loop mirror type.

BRIEF DESCRIPTION OF THE PRIOR ART

A linearity optical fiber loop mirror uses a sagnac interferometer which is stable despite outside environmental influences such as temperature, vibration and the like. Such interferometers have the fundamental configuration of a switch, and include an optical fiber which is a medium to induce the non-linear action.

An interferometer is generally defined as an "optical system" which measures the interference or interference intensity of the light produced by an incident light divided into two beams or signals, the two beams travelling through, or along, paths which are different from each other and then being coupled again. In other words, the interferometer is a kind of a phase-intensity invertor which converts its own inner phase change into a measure of the light intensity. The interferometer is used as a switch wherein the output intensity is turned on or off by the conversion of the inner phase from 0° into 180°. The switch is called an "all optical switch" because the interaction between the light signals induces a phase change as described above. The interaction between light beams is accomplished through the non-linear refractive rate of a medium, in which all refractive rates are changed not according to a constant, but according to intensity of incident light. The non-linear refractive rate indicates the changing amount of the refractive rate by the incidence of the light beams, the size of which is variously dependent upon the material used. Thus, the general interferometer performs the switching operation in a manner such that the medium changes the refractive rate by the incident light having a relatively larger intensity, and the phase change of another light beam passing through the interferometer is induced, whereby the change of its own outputting intensity occurs according to the principle of the interferometer. This enables the interferometer to be used as a switching element. The operational bandwidth of the switch is dependent upon the action time of a medium.

An optical fiber has the fastest action time among non-linear medium in that the non-linear action time on the order of a few femto seconds (second$\times 10^{-15}$). Therefore, a non-linear optical fiber loop mirror using an optical fiber as a non-linear medium is a stable switch having the widest bandwidth among switches that have been provided up to now.

But, the non-linear optical fiber mirror requires that the non-linear action distance (the distance of an optical fiber) be enough to obtain the phase change of 180° required for switching because the non-linear refractive rate of an optical fiber is very much smaller than the other non-linear medium. In other words, the light (the signal light) constituted as an interferometer and the other incident light (adjusting light) each proceed along a path different from each other before the incidence thereof on an interferometer. Referring to an example of a communication system, the signal light is a light transmitted from one terminal station to an exchanger and the adjusting light is a light existing in the exchanger. The two lights or light signals having different paths should be differentiated in order to be separated from/coupled with each other at one interferometer. To accomplish this, the polarizations or wavelengths of the two lights must be made to differ.

If the length of an optical fiber becomes longer and the polarizations or wavelengths between the signal light and the adjusting light are different from each other, the bandwidth of the switch is determined by the color dispersion and polarization dispersion characteristics of the optical fiber. The color dispersion and polarization dispersion indicate the different velocities with which the light passes through an optical fiber according to the wavelength and polarization of light. This corresponds to the walk off by which the signal light and the adjusting light are separated according to the difference between the advancing velocities of the signal light and the adjusting light. When a difference between the advancing velocities of the signal light and the adjusting light occurs, the non-linear action distance is shortened, but the adjusting light necessary for switching must be increased. In this case, the switching window, meaning the time to be switched, becomes wide. The effect of the wider switching window means the inputting signal light to be transmitted can adapt to the timing jitter, but it increases the transmitting capacity of signals, while as the bit speed is raised, it acts as the main factor limiting the bandwidth of the switch. Thus, the specification of components constituting an optical fiber switch must be determined considering the timing jitter and bit speed of the signal light. Then, the conventional interferometer has compensated for the walk off by adjusting the length of an optical fiber or dispersing the color through a special optical fiber such as a dispersion shifted fiber, a dispersion plattened fiber, etc.

The length adjustment of an optical fiber is accomplished by a simple principle, but presents a problem in that a system has limited adaptability. Also, the use of the special optical fiber increases the cost of manufacturing a switch.

The conventional technical configuration will be explained in detail as follows:

FIG. 1 shows the configuration of a conventional non-linear optical fiber loop mirror. The non-linear optical fiber loop mirror comprises a three dB optical fiber coupler 2 for dividing signal light from a signal light source 1 into two signal lights or light signals in a proportion of 50:50, a first wave length division optical fiber coupler 4 for inputting adjusting lights or light signals from an adjusting light source 3 into a sagnac interferometer including an optical fiber loop and a second wave length division optical fiber coupler 5 for extracting adjusting light from the sagnac interferometer.

The two divided signal lights or light signals are advanced in opposite directions through the same path in the interferometer. Therefore, unless the external non-reciprocal perturbation does not occur, the reinforcing interference occurs so that the two signal lights are returned with the energy of incident light, when they are again coupled by the three dB optical fiber coupler 2 to be interfered with each other. Since such an action is same as that of a mirror, the optical fiber loop is normally referred to as an optical fiber loop mirror, and also the port H1 of the three dB optical fiber coupler 2 is generally called a reflecting port.

On the other hand, the non-reciprocal perturbation is such that the perturbation to one of two signal lights traveling in opposite directions to each other is differentially applied with respect to the perturbation to the other signal light. There are, as a non-reciprocal perturbation, different kinds of effects such as a kind of the sagnac effect, the magnetic-optic Faraday effect, the non-linear optical effect, etc. by the loop rotation. These effects induce the phase difference between two lights advancing in opposite directions to each other in the interferometer. The size or amount of the phase difference is proportional to that of the physical phenomena such as the loop rotation, the magnetic field, the non-linear refractive rate. The phase difference causes the outputting intensity of the interferometer to be changed according to the principle of the interferometer. With it, a part of the signal light is extracted from the other port H2 of the three dB optical fiber coupler 2. Thus, the port H2 is normally referred to as a transparent port. The all optical switch uses the non-linear optical effect of the non-reciprocal perturbation. The first wave length division optical fiber coupler 4 and the second wave length division optical fiber coupler 5 each have coupling/separating ratios of 100:0 and 0:100 in relation to the wave lengths of the adjusting light and the signal light, in which the signal light is by-passed without conditions, and the adjusting light is transmitted into the interferometer by the first wave length division optical fiber coupler 4 and consequently transmitted to an outside system by the second wave length division optical fiber coupler 5.

Therefore, the outputting intensity I of the signal light at the transparent port H2 is obtained as follows:

$$I = \frac{I_o}{2}[1 - \cos(\Delta\phi)] \quad (1)$$

Wherein, $\Delta\phi$ is the phase difference of the two signal lights $I_a$ and $I_b$ advancing in opposite directions.

$$\Delta\phi = |\phi_a - \phi_b| \quad (2)$$

Wherein $I_o$ is the intensity of the inputting signal light, $\phi_a$ and $\phi_b$ are respectively the phase values when the signal lights $I_a$ and $I_b$ pass through the optical fiber loop.

If there is no non-reciprocal phase perturbation, $\Delta\phi$ is always 0, and any light from the transparent port H2 is not outputted. At that time, the switch remains at the turned-off state.

If the phase of $I_o$ induced by the adjusting light due to the non-linear phenomena is 180°, the outputting intensity I and the inputting intensity $I_o$ of the signal light are identical to each other. Therefore, the energy of the inputted light is entirely passed through the transparent port H2, and the switch is turned on. Regarding the signal light $I_a$ moving in the same direction as the adjusting light pulse, an amount of the phase changing induced by the adjusting light is calculated as the accumulation of the non-linear refractive rate according to the length of the optical fiber. In other words, it is represented in a numerical formula as the integration of the non-linear refractive rate according to the length of the optical fiber. Regarding the signal light $I_a$ moving in the direction opposite to the adjusting light pulse, the non-linear phase changing induced by the adjusting light is determined by the average intensity of the adjusting light pulse.

Considering these points, when the signal lights $I_a$ and $I_b$ each pass through the optical fiber loop, the phase values $\phi_a$ and $\phi_b$ are each calculated as follows:

$$\phi_a - k_s \int_0^L 2n_2 I_c(t-\tau)dz \quad (3)$$

$$\phi_b - k_s 2n_a \langle I_c \rangle L \quad (4)$$

Wherein, $k_s = 2\pi/\lambda_s$, $\lambda_s$ is the wavelength of the signal light, L is the length of an optical fiber, $n_2$ is the non-linear refractive rate of the optical fiber, $I_c$ is the peak intensity of the adjusting light and $\langle I_c \rangle$ is the average intensity of the adjusting light. In the formula 3, $\tau$ is the walk-off time per a unit length between the adjusting light and the signal light. What the adjusting light is the function of $t-\tau z$ is to consider the walk-off. Thus, the phase difference $\Delta\phi$ is given as follows:

$$\Delta\phi - k_s |[2n_2 I_c(t-\tau z) 2n_2 \langle I_c \rangle]\, dz| \quad (5)$$

The formula 4 indicates that the phase value $\phi_a$ is not simply proportional to the length of the optical fiber, which is a medium to enable interaction between the signal light and the adjusting light, but also that the saturating phenomena occurs according to the length of the optical fiber. The size of the saturation is given as follows:

$$\Delta\phi_1 = \frac{\Delta\pi}{\lambda_s} n_2 I_c \frac{\Delta t_o}{\tau} \quad (6)$$

Wherein, $\Delta t_o$ is the pulse width of the adjusting light.

The profile of the phase value $\phi_a$ is a square shape wherein the phase difference $\Delta\phi_1$ is the height and $\tau L$ is the half power width as shown in FIG. 2A and represented in formula 6. FIG. 2B illustrates the result calculated from formula 4. FIG. 2C illustrates the waveform of $\Delta\phi$, and undertakes that the DC component of a larger size is existed. The DC component acts as an element in the deterioration of the on-off ratio of the switching output.

As the average intensity $I_c$ of the adjusting light is adjusted to force the formula of $\Delta\phi_1 - \Delta\phi_2$ to be $\pi$ (180°), all the components of the signal light are switched in the scope from the incident time to the time $\tau_c L$. This means that the switching window is widened until the time $\tau_c L$. Therefore, even through the transmitted signal light has a little timing jitter, the signal light is switched by being placed in the switching window.

But, when the bit speed of the signal light is increased and the pulse cycle becomes shorter than the time $\tau_c L$, this acts as an element for limiting the transmitting bit speed of the signal light because the switching occurs at an undesirable time.

Also, the all optical switch using a conventional non-linear loop mirror uses a dispersion shifted optical fiber having a small walk-off time $\tau$ as a medium in order to narrow the width of the switching window or adjust the length L of the optical fiber, if the bit speed becomes fast. This has disadvantages in that the optical switching apparatus can be adapted to the changed bit speed, unless the switching apparatus is newly constructed, if the bit speed is changed after the construction of the switching apparatus suitable to the bit speed. Thus, it is not possible for the conventional switch apparatus to properly change the bit speed if necessary.

SUMMARY OF THE INVENTION

The main object of the invention is to provide a non-linear fiber loop mirror structure of a very high-speed time dividing switch which removes the limitation imposed on the switching speed by the walk-off effect of the adjusting light and the signal light.

The other object of the invention is to provide an all-optical signal processing apparatus of a non-linear optical fiber loop mirror type for adjusting the width of a switching window so as to adapt to the timing jitter of a particular signal light and to remove the limitation of the bandwidth of the optical fiber switch by the walk-off effect of the adjusting light and the signal light according to the state of a system without the adjustment of the length of an optical fiber or the use of a special optical fiber.

In order to accomplish these objects and features, the invention is characterized in that another adjustment light having a proper time delay to an existing adjusting light is additionally introduced in order to compensate for the limitations on the switching bandwidth, imposed by the walk-off between adjusting and signal lights, which is associated with a conventional non-linear optical fiber loop mirror.

BRIEF DESCRIPTION OF THE DRAWINGS

The invention now will be described in detail with respect to the accompanying drawings, in which.

DETAILED DESCRIPTION OF THE INVENTION

Figure 1:
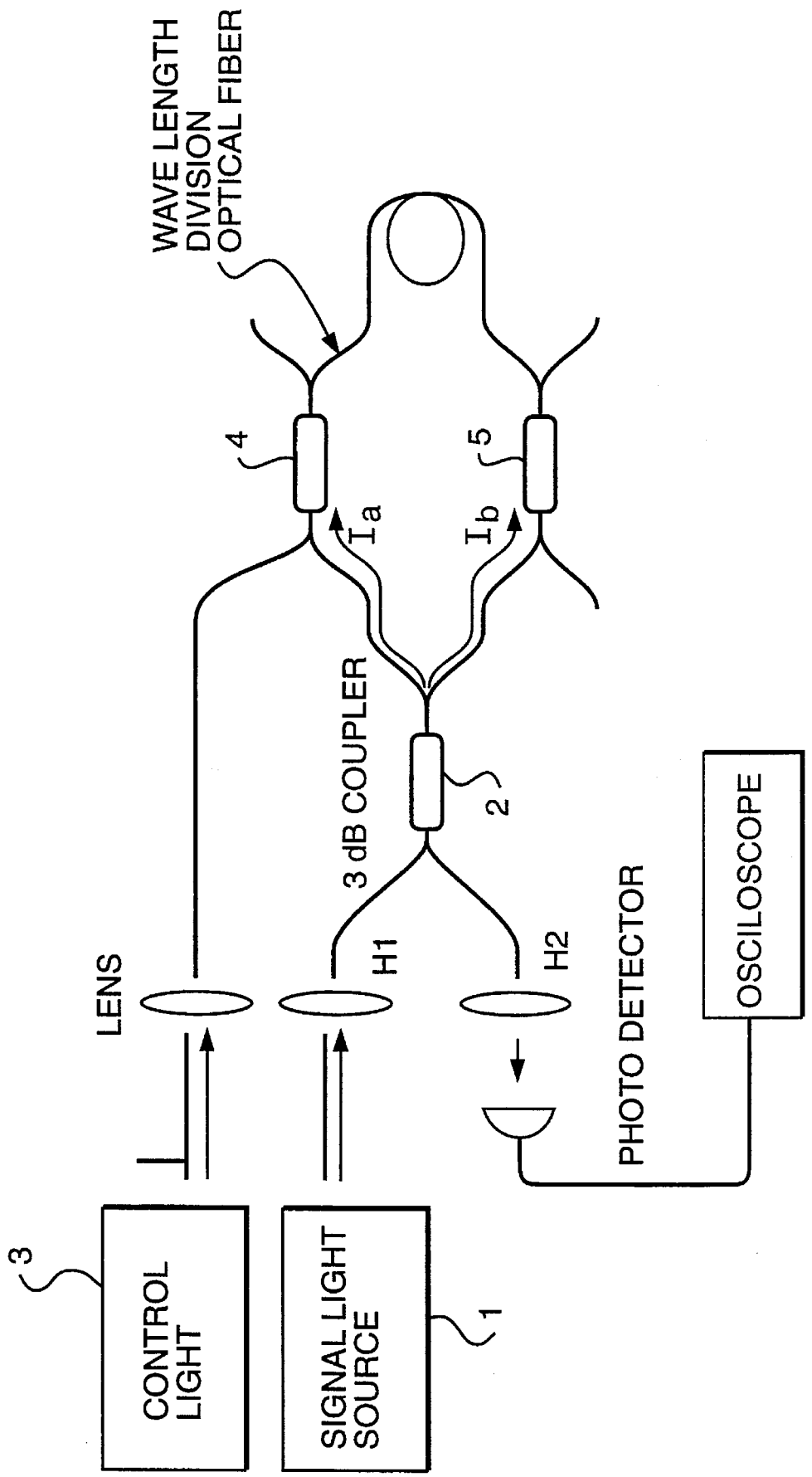
FIG. 1 is a view illustrating the configuration of an all-optical switch apparatus of a conventional non-linear optical fiber loop mirror type.
Figure 3:
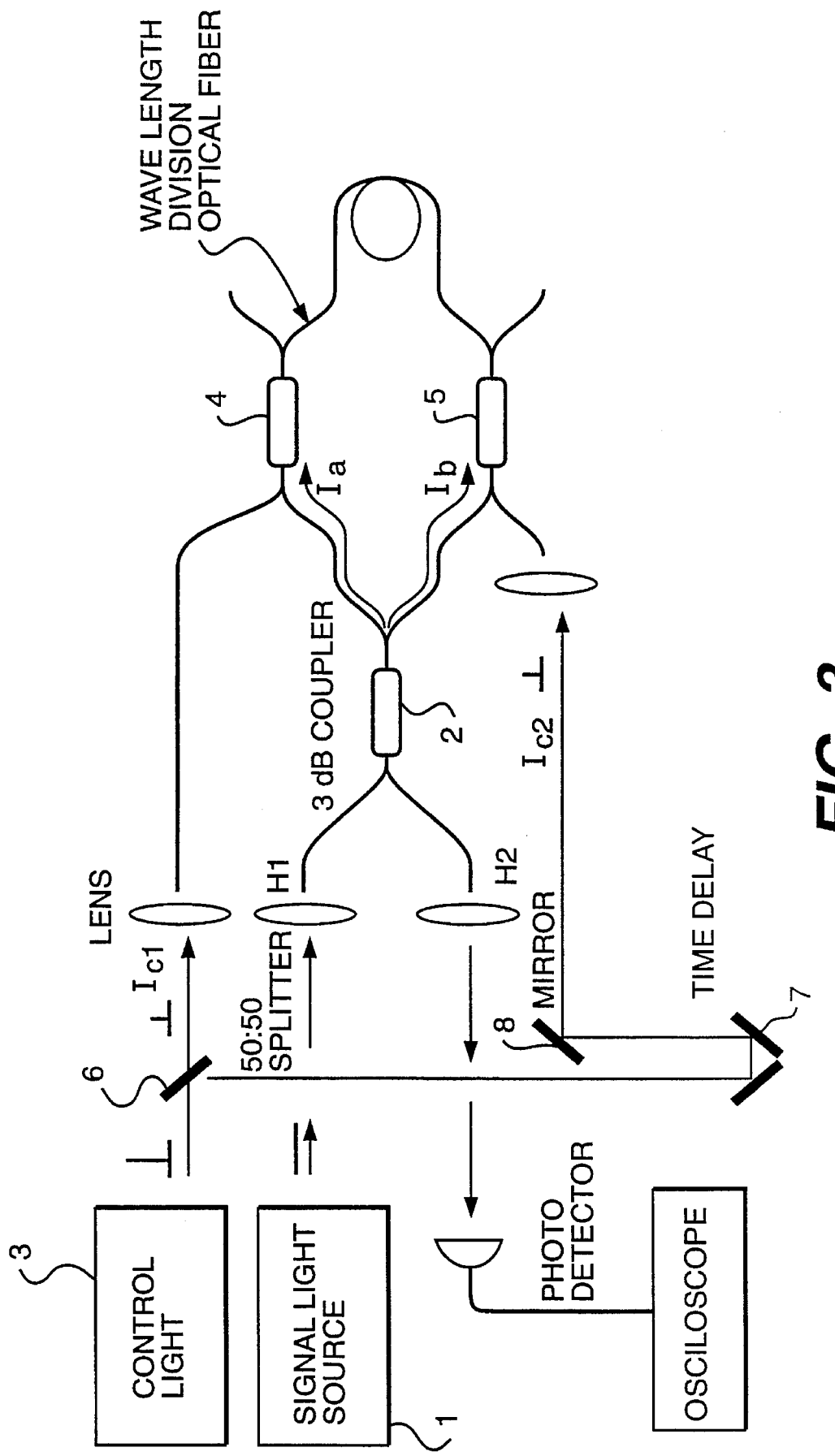
FIG. 3 is a view illustrating the configuration of an all-optical signal processing apparatus of a non-linear optical fiber loop mirror type.

FIG. 3 illustrates the configuration of an all-optical signal processing apparatus of a non-linear optical fiber loop mirror type, in which the same elements as those of FIG. 1 are referenced in the same way.

An all-optical signal processing apparatus according to the invention uses two adjusting lights. In other words, the all-optical signal processing apparatus is provided with another adjusting light $I_{c2}$ having an appropriate time delay with respect to an adjusting light $I_{c1}$ used in a conventional non-linear loop mirror structure and the same intensity as that of the adjusting light.

Thus, the all-optical signal processing apparatus comprises a three dB optical fiber coupler 2 for dividing signal light from a signal light source 1 into two signal lights of equal proportion, i.e., in a proportion of 50:50, a first wave length division optical fiber coupler 4 for inputting adjusting lights from an adjusting light source 3 into a sagnac interferometer including an optical fiber loop, a second wave length division optical fiber coupler 5 for extracting adjusting light from the sagnac interferometer, a light divider 6 for dividing adjusting light from the adjusting light source 3 into two adjusting lights $I_{c1}$ and $I_{c2}$ in a proportion of 50:50 and a delay line for delaying one of the two adjusting lights for a predetermined time period in order to set the difference between the transmitting times of one of the two adjusting lights and another signal light.

The delay path includes a delay unit or a delayer 7 for delaying one adjusting lights from the light divider 6 for a predetermined time period and a mirror for inputting the adjusting light, as time-delayed by the delayer 7, into the second wave length division optical fiber coupler 5.

Therefore, the adjusting light $I_{c2}$ is inputted through the delay path and the second wave length division optical fiber coupler 5 into a interferometer. Herein, it is noted that according to the configuration of the invention in all two signal lights there is an adjusting light moving in the same direction as those of two signal lights which are travelling or advancing in opposite directions to each other in the interferometer, unlike a conventional configuration.

If the two adjusting lights are inputting into the interferometer without the time-delay, the two signal lights have the same phase change. As a result, the phase difference between the two signal lights is zero. To the contrary, if the two adjusting lights are each delayed to generate the difference between the times transmitted to each of the first and second couplers 4 and 5, while the delay time period (or width) is set to become smaller than the width $\tau_c L$ of a conventional switching window, the configuration of the optical fiber switch according to the invention enables a switching window having a width identical to the time delay period to be opened. In other words, the size (width) of the switching window is determined by the inputting time difference between the two adjusting lights, which is independent of the walk-off between the adjusting light and the signal light. Thus, it is known that the size (width) of the switching window is not related to the wavelength of the adjusting light to be used.

This is represented as follows:

$$\Delta\phi = sk_s \int_0^L [2n_2 I_c(t - \tau z) - 2n_2 \langle I_c \rangle - \\ 2n_2 I_c(t - t_d - \tau z) + 2n_2 \langle I_c \rangle] dz - \\ 2k_c n_2 \int_0^L [I_c(t - \tau z) - I_c(t - t_d - \tau z)] \quad (7)$$

wherein, $t_d$ is a transmitting time difference between two adjusting lights. This is illustrated in FIGS. 4A to 4C.

Figure 2A:
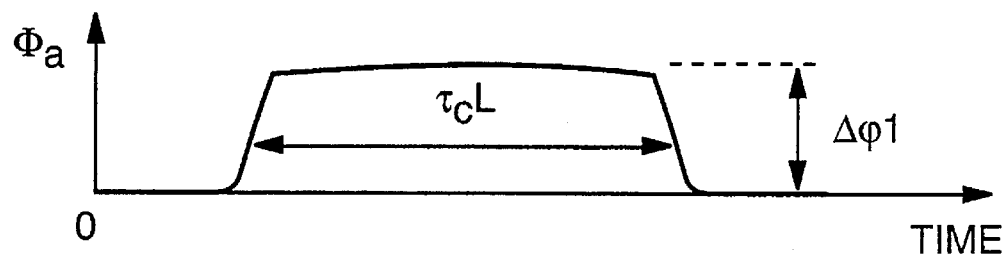
FIG. 2A is a waveform illustrating the phase change when signal lights of a consecutive vibrating type traveling in the same direction as adjusting light pulses which pass through the length L of an optical fiber in the apparatus of FIG. 1.
Figure 2B:
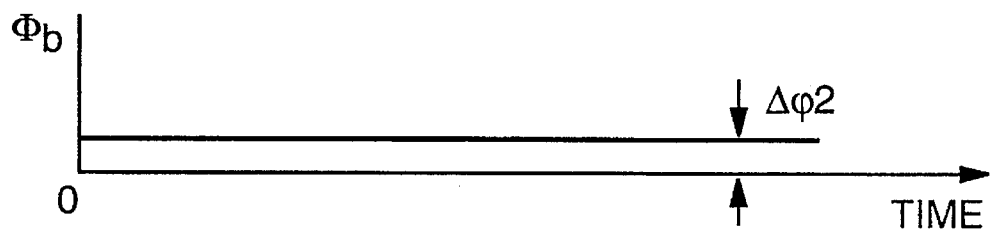
FIG. 2B is a waveform illustrating the phase change when signal lights of a consecutive vibrating type traveling in a direction opposite to adjusting light pulses which pass through the length L of an optical fiber in the apparatus of FIG. 1.
Figure 2C:
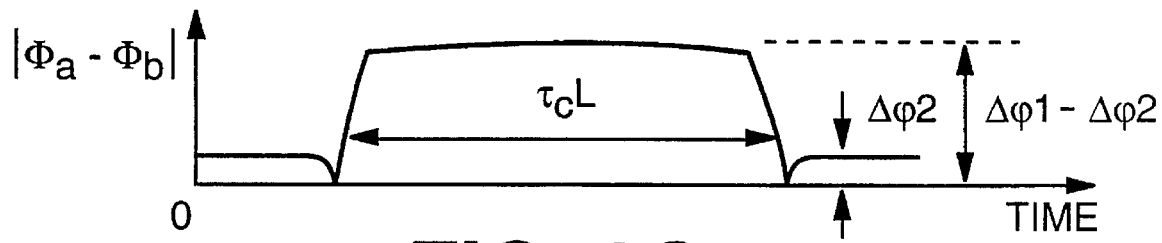
FIG. 2C is a waveform view illustrating the phase difference when signal lights of a consecutive vibrating type traveling in the same or opposite direction with respect to adjusting light pulses which pass through the length L of an optical fiber in the apparatus of FIG. 1.
Figure 4A:
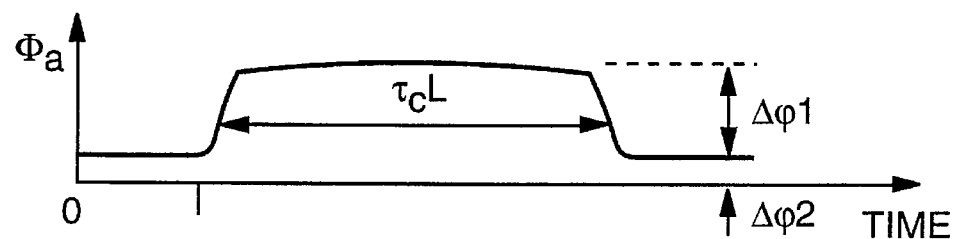
FIG. 4A is a waveform illustrating the phase change when signal lights of a consecutive vibrating type advancing in the same direction as adjusting light pulses which pass through the length L of an optical fiber in the apparatus of the invention.
Figure 4B:
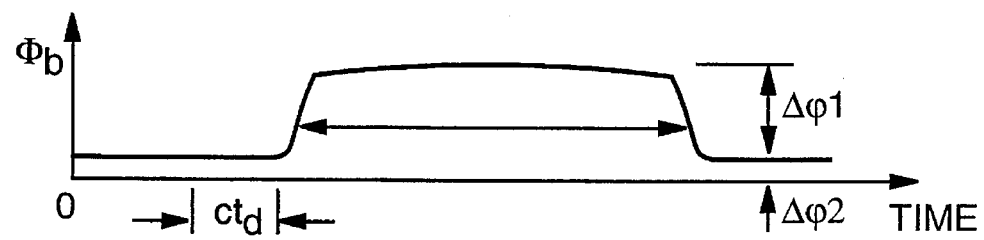
FIG. 4B is a waveform illustrating the phase change when signal lights of a consecutive vibrating type advancing in the opposite direction with respect to adjusting light pulses which pass through the length L of an optical fiber in the apparatus of the invention; and, FIG. 4C is a waveform illustrating the phase difference when signal lights of a consecutive vibrating type advancing in the same or opposite direction with respect to adjusting light pulses which pass through the length L of an optical fiber in the apparatus of the invention.

FIG. 4A, shows a waveform of a phase $\phi_a$ when a signal light $I_a$ passes through an optical fiber loop, the waveform including DC components as in FIG. 2A. But, the DC component is offset by the DC component of a phase $\phi_b$ in FIG. 4B, and thus there is no DC component at the ultimate switching output (Δφ).

Figure 4C:
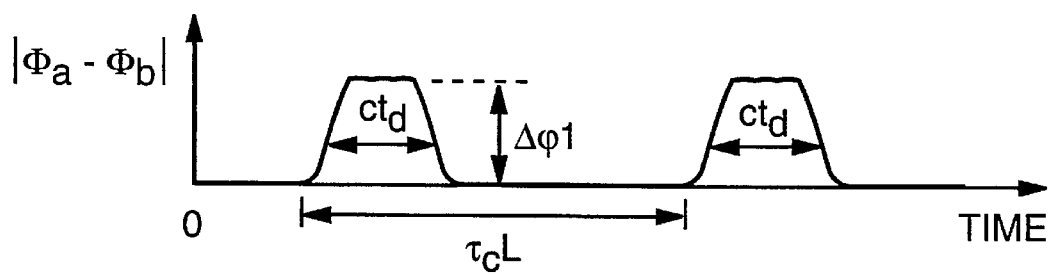

FIG. 4C shows a waveform of a phase (Δφ) which has no DC component.

As described above, it will be appreciated that the DC component is eliminated, and the switching window can be adjusted by the transmitting time difference (the size of the delay time of the other adjusting light with respect to one adjusting light) between two adjusting lights and one switching window provided at one cycle of the adjusting light.

Also, it will be appreciated that the gap of two switching windows is identical to the walk-off time between the original adjusting and signal lights.

If the length of an optical fiber is adjusted to force the walk-off time to correspond to a half period of the original adjusting light, the switching period is increased twice over that of the existing configuration. This will be useful in the reverse multiplexing of very high-speed larger capacity signals. For example, the adjusting light of a period corresponding to half of the period to be multiplexed is used. Therefore, the speed of the modulation circuit for the adjusting light is reduced by a half, manufacturing of the circuit is easy and cost is decreased.

Accordingly, the invention by using two adjusting lights can compensate for the cross-talk of the noise signals due to DC components generated in the conventional apparatus, and obtain a switching window of a desirable size by properly adjusting the time delay between two adjusting lights and also resolve the bandwidth limitation of a switch due to the walk-off of the adjusting and signal lights according to the timing jitter of signal light.

What is claimed is:

1. An all-optical signal processing apparatus of a non-linear fiber loop mirror type including a three dB optical fiber coupler for dividing a light signal inputted from a light signal source into two light signals in a proportion of 50:50, a first wave length division optical fiber coupler for receiving an adjusting light signal produced by an adjusting light source via a sagnac interferometer having an optical fiber loop, and a second wave length division optical fiber coupler for receiving the adjusting light signal from the sagnac interferometer, said apparatus further comprising:

a light divider for dividing said adjusting light signal received from the adjusting light source into two adjusting light signals $I_{c1}$ and $I_{c2}$ in a proportion of 50:50; and a delay line for delaying one of said two adjusting light signals for a predetermined time so as to set a time difference between one of said two adjusting light signals and another light signal; said delay line comprises a delay device for time delaying said one adjusting light signal received from the light divider and a mirror for outputting said one adjusting light signal after being time delayed by the delay device to the second wave length division optical fiber coupler.

* * * * *